A. L. BURTT & J. TAYLOR.
ANTISKIDDING TIRE PROTECTOR.
APPLICATION FILED OCT. 20, 1913.
1,200,807.
Patented Oct. 10, 1916.
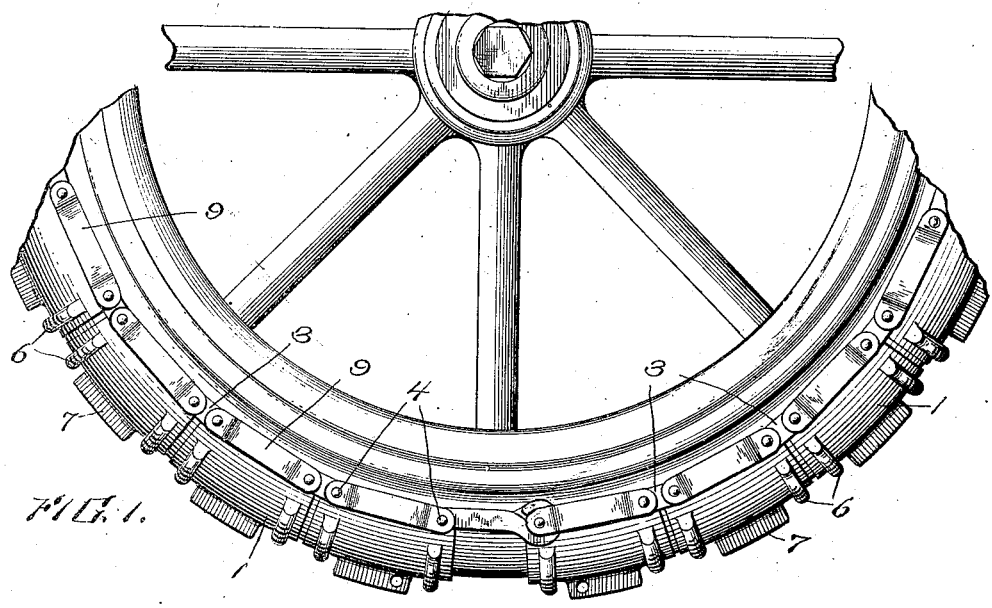
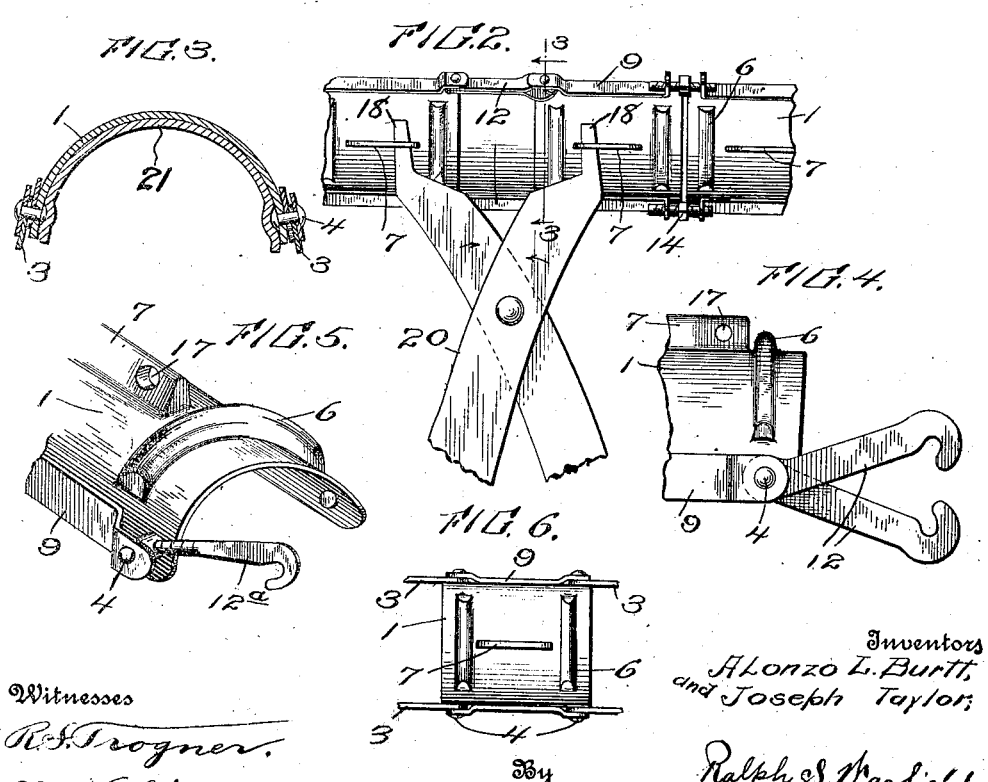
Witnesses
R. S. Frogner.
M. V. Simms.
Inventors
Alonzo L. Burtt,
and Joseph Taylor;
By Ralph S. Warfield
Attorney

UNITED STATES PATENT OFFICE.

ALONZO L. BURTT AND JOSEPH TAYLOR, OF CHARDON, OHIO, ASSIGNORS OF THREE-FOURTHS TO SAID BURTT AND ONE-FOURTH TO SAID TAYLOR.

ANTISKIDDING TIRE-PROTECTOR.

1,200,807.      Specification of Letters Patent.      Patented Oct. 10, 1916.

Application filed October 20, 1913. Serial No. 796,370.

*To all whom it may concern:*

Be it known that we, ALONZO L. BURTT and JOSEPH TAYLOR, citizens of the United States, residing at Chardon, in the county of Geauga and State of Ohio, have invented certain new and useful Improvements in Antiskidding Tire-Protectors, of which the following is a specification.

This invention relates to means for protecting pneumatic tires, such as are commonly used upon automobiles and more particularly to that class of protective devices which is designed to prevent skidding.

One object of our invention is to provide an anti-skidding device of the chain type which may be readily applied to the tire or detached therefrom and which is provided with means for adjustment to tires of different diameters.

Another object is to provide reinforcing means which will furnish sufficient rigidity at the sides of the links, enabling the main body of each link to be made of very thin sheet metal and also to furnish continuously connected peripheral strain or tension members.

Other objects will appear from the following description in connection with the accompanying drawings, in which—Figure 1, is a side elevation of a portion of an automobile wheel provided with an improved antiskidding tire protector embodying our invention; Fig. 2, is a top plan view of a portion of the tire protector showing the manner of applying the attaching pliers; Fig. 3, is a cross-section on the line 3—3 of Fig. 2; Fig. 4, is an enlarged side elevation of a portion of a terminal section and one form of connecting hook or latch; Fig. 5, is a perspective view of a portion of a terminal section and another form of connecting latch or hook; and Fig. 6, is a top plan view of one of the intermediate sections.

Our antiskidding tire protector is of the chain type in which a series of sections 1, slightly separated and connected into a continuous chain by means of lateral links 3, pivotally secured to studs or rivets 4, projecting upon opposite sides near the ends of each section. Each chain section is semi-circular in cross-section and is made of thin sheet metal and provided with integral transverse ribs 6 near each end and an intermediate longitudinal bead 7, which effectually prevent slipping or skidding.

The sections are slightly separated from each other and are pivotally connected by links 3, pivotally attached to the studs 4, so that the chain will be longitudinally flexible and the individual links may yield with the tire as the successive sections contact with the ground. The shell or body of each section is preferably made of thin sheet metal and for the purpose of reinforcing the same longitudinally we provide lateral straps 9, extending along each side and secured at each end to the studs 4. These side straps also perform a very important function as tension members coöperating with the links 3 to form continuous uninterrupted peripheral bands to sustain the longitudinal stresses exerted upon the chain and relieving the studs 4 which merely serve as connecting rivets. By reason of this construction, as previously pointed out, the shell or body of the chain sections may be made of thin sheet metal, the rigidity and strength being augmented by the tension and reinforcing straps 9.

The terminal sections are connected by latch members or hooks. In Figs. 2 and 4 we have shown the connecting hooks 12, pivotally mounted in pairs upon the studs 4, upon opposite sides of one terminal section and adapted to engage the studs upon the opposite terminal section. The members of each pair of hooks are preferably reversely arranged so as to embrace the stud from opposite sides for the purpose of greater security, since any shock or jar tending to loosen one member will correspondingly tighten the grip of the other member.

When using latches of the form shown in Fig. 4, the chain may be provided with turnbuckles 14, for the purpose of adjusting the length of the chain. It is sometimes desirable to dispense with auxiliary adjusting devices and for this purpose we provide latches or connecting hooks 12$^a$, such as illustrated in Fig. 5. The shank is threaded and may be screwed more or less into a nut 15, which is swiveled upon the end stud 4 of the terminal section. In order to draw the terminal sections slightly toward each other for the purpose of engaging or disengaging the connecting latch members 12, or 12$^a$, we provide the longitudinal projections or beads 7 of said terminal sections with apertures 17, to receive the jaws 18, of a pair of tongs 20. To prevent injury to the tire from any cutting or wearing action of the chain, we provide a lining of canvas, leather or sheet rubber 21.

While we have described in detail the construction illustrated in the accompanying drawings for the purpose of disclosing an embodiment of our invention, it is obvious that various changes and modifications may be made therein without departing from the spirit of our invention.

We claim:—

1. A tire protector comprising a flexible chain composed of semi-cylindrical plates or sections and means for connecting said sections, each of said sections having reinforcing straps extending longitudinally upon each side and secured thereto and to said connecting means.

2. A tire protector comprising a flexible chain composed of semi-cylindrical plates or sections having studs at each end upon opposite sides, links pivotally secured to said studs and connecting adjacent sections, reinforcing straps extending upon each side of said sections and secured at opposite ends to said studs, thereby forming with said links continuous tension members throughout the length of the chain.

3. In an anti-skidding device for tires, a pair of sections, reinforcing straps, extending longitudinally upon each side thereof and secured thereto and means for uniting said sections comprising a member rotatably secured between one of said sections and the adjacent reinforcing strap, and a device longitudinally adjustable in said rotatable member for connecting with the adjacent section.

In testimony whereof we affix our signatures in the presence of two witnesses.

ALONZO L. BURTT.
JOSEPH TAYLOR.

Witnesses:
S. A. BARKER,
R. L. DENTON.